Nov. 14, 1933.  D. T. BROWNLEE  1,934,790
OVERRUNNING SPRING CLUTCH
Filed June 25, 1932
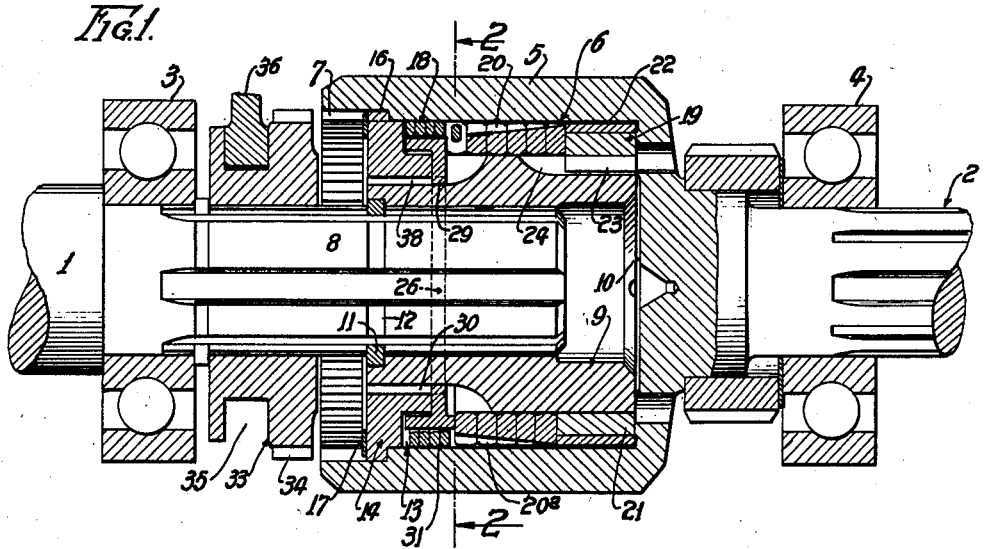
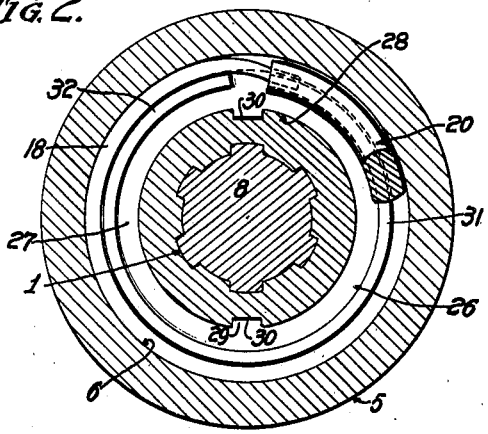
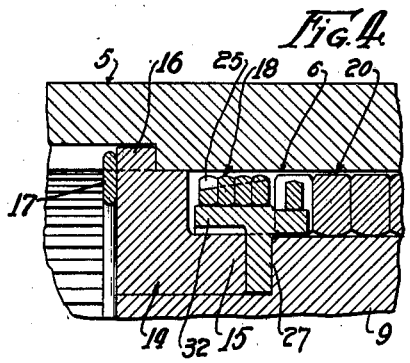
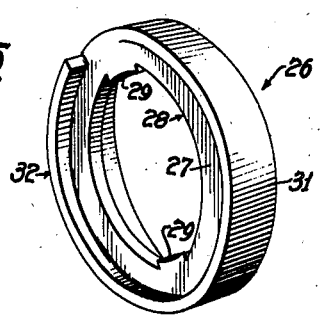
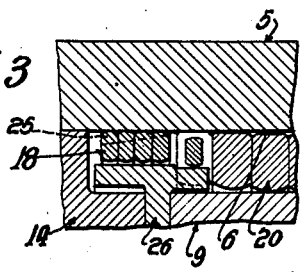
Inventor:
Delmar T. Brownlee,
By: Arthur M. Nelson
Atty.

Patented Nov. 14, 1933

1,934,790

UNITED STATES PATENT OFFICE 1,934,790

OVERRUNNING SPRING CLUTCH

Dalmar T. Brownlee, Indianapolis, Ind., assignor to L. G. S. Devices Corporation, Indianapolis, Ind., a corporation of Indiana Application June 25, 1932. Serial No. 619,242

10 Claims. (Cl. 192—41)

This invention relates to improvements in overrunning spring clutches and it consists of the matters hereinafter described and more particularly pointed out in the appended claims.

The clutch with which my invention is more particularly concerned is of the kind including a driving member and a driven member, together with a clutch spring which operates in a relative rotation between said members in one direction to operatively clutch said members together. The clutch spring is of the type which includes an energizing portion having turns of greater elasticity than that of the other portions of the spring and normally has a slight running drag with that surface of the clutch which the spring grips when clutching the two members of the clutch together.

In the relative rotation of said driving and driven members, the spring is caused to change its diameter to clutch said members together. In some types of clutches, the spring expands radially and in other types of clutches the spring contracts to perform its clutching action.

In either type of clutch, when the driven member tends to drive the driving member, the spring so changes its diameter as to allow the driven member to overrun the driving member. In this change of diameter, I have discovered that it is desirable to limit or hold the energizing portion against an abnormal amount of movement which not only tends so to change its character as to reduce its efficiency but such normal amount of movement is also apt to break one or more turns of said energizing portion.

The primary object of the present invention is to provide in a clutch of this kind, a simple and efficient means so cooperating with the energizing portion of the spring as to limit and support the same against an abnormal change in its diameter when the driven member tends to overrun the driving member.

The above mentioned object of the invention, as well as others, together with the advantages thereof, will more fully appear as I proceed with my specification.

In the drawing:

Figure 1 is a longitudinal vertical sectional view through an overrunning spring clutch embodying my improved construction;

Figure 2 is a transverse vertical sectional view through the same as taken on the line 2—2 of Figure 1;

Figure 3 is a detail sectional view, on an enlarged scale, of parts appearing in Figure 1 and illustrates more particularly the normal position of the energizing end of the spring when operating to form a driving connection between the drive and driven parts;

Figure 4 is a view similar to Figure 3 but illustrating the manner in which the limiting and supporting means prevent an abnormal condition arising in the energizing portion of the spring when an overrunning action is induced in the clutch; and Figure 5 is a perspective view of an annular limiting supporting member for the energizing end of the spring to prevent an abnormal condition thereof during overrunning between the clutch parts.

In general, my improved overrunning spring clutch as here shown includes a driving shaft and an axially arranged driven shaft, said shafts carrying inner and outer concentric clutch members that cooperate to provide an annular clutch spring receiving recess or pocket. In said recess or pocket is located a clutch spring including an energizing portion at one end. This energizing portion normally has a slight frictional drag with respect to one of the clutch members while the other end of the spring has an anchored engagement with the other clutch member.

When the two clutch members rotate relatively in one direction, the spring is so operated upon as to be caused to progressively change its diameter in one direction beginning at its energizing end and gradually building up into a full gripping action of the spring with respect to that clutch member with which it has only a slight frictional drag.

When the said clutch members rotate relatively in the other direction, said spring is caused to again change its diameter in the other direction to release its gripping action from the clutch member, theretofore engaged thereby, so that one clutch member overruns the other. In this overrunning action of the two clutch members, in previous structures for this purpose, the energizing portion of the spring often so changed its diameter as to result in an abnormal condition causing undesired stresses in this portion of the spring. This abnormal change also produced a delayed action when the clutch members again rotated relatively in the first direction, thus detracting from the sensitivity of the clutch as a whole and also subjecting the spring to severe shock, sometimes resulting in breakage of the spring.

In the present construction, to prevent the objections above noted, I provide a limiting and supporting means for the energizing portion of the spring, which in the overrunning of the two clutch members prevents the energizing portion from assuming such an abnormal condition. In this way the excess strains are removed therefrom and delayed action is avoided thus rendering the clutch more sensitive in operation as well as increasing the effective life of the spring.

Referring now in detail to the embodiment of the invention, illustrated in the accompanying drawing: 1 indicates a driving shaft and 2 indicates an axially arranged driven shaft associated therewith and which shafts may be respectively, the power take-off end of a change speed transmission and an associated shaft adapted for connection with the propeller shaft of an automobile. Both shafts are journalled in antifriction bearings 3 and 4 respectively, supported in parts of a suitable casing (not shown) enclosing the clutch as a whole.

The driven shaft 2 is formed at its front end with a cup-shaped clutch member 5 having an internal clutch surface 6 and in the front end of said member are internal spline teeth 7. The rear end 8 of the driving shaft which is suitably splined, extends into the clutch member 5 and there has secured to it, a sleeve 9. Said sleeve substantially abuts at one end against the rear end wall 10 of the clutch member 5 and is held against endwise displacement by a spring collar 11 seated in an annular groove 12 in the splined end 8 of the driving shaft 1.

The clutch member 5 and sleeve 9 coact to provide an annular recess 13 closed at one end by the wall 10 and closed at the other end by a ring 14, rotatively mounted on the front end of the sleeve 9. This ring 14 has an annular extension or hub 15 at its rear end and also has splines 16 on its periphery mating with those splines 7 on the clutch member 5. A snap ring 17 engaged in a suitable groove in the splines 7 serves to hold said ring 14 against endwise displacement.

In the recess 13 is located a clutch element in the form of a spring and in this instance, said spring includes an energizing portion 18 at one end, a load carrying portion 19 at the other end and an intermediate load building up portion 20.

The load carrying portion comprises a relatively wide band 21 with a facing 22 of bearing metal or alloy sweated thereon, said band and facing being split at one point to provide ends and one of said ends is provided with an inwardly extending toe 23 anchored in a groove 24 in the rear end of the sleeve 9. The other end of said band and its facing are operatively connected to the associated end of the load building up portion 20 in any suitable manner.

The building up portion constitutes a plurality of turns, all of the same cross sectional area and to increase the elasticity of said building up portion towards the energizing portion, I provide in the turns of said building up portion, longitudinally extending arcuately spaced grooves 20a that increase in depth toward the energizing portion of the spring. Both the load carrying and building up portions of the spring have such a normal outside diameter as to provide a slight clearance with respect to the surface 6 to be gripped thereby.

The energizing portion 18 of the spring comprises a plurality of turns all of the same cross sectional area and which area is somewhat less than that of the turns of the building up portion. The turns in said energizing portion have an outside diameter normally somewhat greater than that of the surface 6 so as to normally have a slight frictionl drag thereon. As the turns of the energizing portion have a cross sectional area less than that of the turns in the building up portion, it is apparent that they have more elasticity, and to increase this elasticity toward the free end thereof, said turns may be provided with sets of grooves 25 as best shown in Figs. 3 and 4. These grooves increase in depth toward the free end of the energizing portion so that the turn at said free end has the greatest elasticity. The other end of said energizing portion enters and is fixed in the associated end of the first turn of the building up portion.

To prevent an abnormal condition in the energizing portion of the spring such as too great a contraction thereof in the overrun between the clutch member 5 and sleeve 9, I limit such contraction and support said portion by means of an annular supporting member 26, the shape of which is best shown in Fig. 5. Said member includes a radial web portion 27 having an opening 28 therein so as to fit upon the front end of the sleeve 9 against the annular hub portion of the closure ring 14. Said web is provided with oppositely disposed lugs 29 that engage in grooves 30 in opposite sides of the front end portion of the sleeve 9 which front end portion is reduced in diameter with respect to the rear end portion thereof. Thus this annular supporting member rotates with the sleeve 9.

The member 26 also includes an annular flange 31 formed at one side of the web to overhang the hub 15 of the ring 14 and formed at the other side as a helix 32 which corresponds in its pitch to the pitch of the first turn of the building up portion 20 of the spring.

The flange 31—32 is of an outside diameter slightly less than the inside diameter of the turns in the energizing portion when in its normal unstressed condition. Thus when the driving member 1 is rotating in the proper direction, it acts through the sleeve 9 and load carrying and building up portions of the spring respectively, to cause the energizing portion to change its diameter and to grip the surface 6 and thus progressively build up the gripping action of the spring throughout its length toward its load carrying portion. When the said spring has thus gripped against the surface 6, this clutches the shaft 2 to the shaft 1 so as to be driven thereby.

Should the shaft 2 tend to rotate at a speed greater than that of the shaft 1, this will cause the spring to change its diameter in the opposite direction so that the clutch member 5 can overrun the sleeve 9. In the present instance, this last mentioned change in diameter would be one to contract its diameter and as the energizing portion is the most flexible portion, said portion contracts until it engages the flange 31—32 of the member 26. This engagement takes place before said energizing portion reaches an undesired abnormal condition. Said abnormal condition of the energizing portion, which is but momentary, is best shown in Fig. 4, wherein a clearance is illustrated between said energizing portion and the surface 6. When this position is reached, the energizing portion due to its inherent tendency to expand, will almost instantaneously return to a position wherein it again engages the surface 6. It is apparent that if the contraction of said energizing portion were not so limited and then supported, it would not only contract to such a diameter as would delay its return to normal operative position but such contraction would also stress the turns to such an extent as would be apt to break the spring. By providing the limiting and supporting member as described, the delayed return action of the spring is avoided so that the clutch is rendered more quickly responsive in its operation. Furthermore by removing the abnormal shock the life of the energizing portion is greatly increased.

Means are provided to lock-out the operation of the clutch spring when so desired and such means are as follows:

Longitudinally shiftable on the splined part 8 of the shaft 1, between the bearing 3 and sleeve 9 is a collar 33 having external spline teeth 34 at its rear end and an annular groove 35 near its front end. Said groove is adapted to receive one end of a shifter yoke 36. When the parts are in the position shown in Fig. 1, then the driving shaft operates through the clutch spring to drive the driven shaft. When the collar 33 is shifted rearwardly to engage its spline teeth 34 with those on the front end of the clutch member 5, then said clutch member is positively connected to the shaft 1 independent of said spring so that said shafts will rotate together in both directions.

While in describing the invention, I have referred in detail to the form, arrangement and construction of the various parts, the same is to be considered merely as illustrative of one form thereof so that I do not wish to be limited thereto, except as may be specifically set forth in the appended claims.

I claim as my invention:—

1. An overrunning spring clutch embodying therein a driving member and a driven member and a clutch spring associated with said members, and including a load carrying portion and a more resilient energizing portion the energizing portion normally being of a diameter different from that of the load carrying portion and normally having a slight frictional drag with one of said members, said spring operating in a relative rotation between said members in one direction to change its effective diameter in one direction to clutch said members together through the load carrying portion and operating in a relative rotation between said members in the opposite direction to change its diameter in a second direction to declutch said members and means associated with the energizing portion of the spring for limiting the change in diameter of the energizing portion of the spring in said second direction.

2. An overrunning spring clutch embodying therein a driving member and a driven member and a clutch spring associated with said members, including a load carrying portion and a more resilient energizing portion the energizing portion normally being of a diameter greater than that of the load carrying portion and normally having a slight frictional drag with the driven member, said load carrying portion of the spring operating in a relative rotation between said members in one direction to radially expand to clutch said members together and also operating in a relative rotation between said members in the other direction to radially contract and declutch said members, and means associated with the energizing portion of the spring for limiting the contraction of said energizing portion of the spring.

3. An overrunning spring clutch embodying therein a driving member and a driven member and a clutch spring associated with said members, including a load carrying portion and a more resilient energizing portion the energizing portion normally being of a diameter greater than that of the load carrying portion and normally having a slight frictional drag with the driven member, said load carrying portion of the spring operating in a relative rotation between said members in one direction to radially expand to clutch said members together and also operating in a relative rotation between said members in the other direction to radially contract and declutch said members, and means associated with the energizing portion of the spring for limiting the contraction of said energizing portion of the spring, and for supporting said energizing portion of the spring when so limited in contraction.

4. An overrunning spring clutch embodying therein a driving member and a driven member and a clutch spring associated with said members and including a load carrrying portion and a more resilient energizing portion, the load carrying portion being operatively connected at one end to one of said members and the energizing portion having but a slight frictional drag with respect to the other of said members, said load carrying portion of the spring operating in a relative rotation between said members in one direction to change its effective diameter in one direction to clutch said members together and also operating in a relative rotation between said members in the opposite direction to change its diameter in a second direction to declutch said members and means rotative with respect to that member with which said energizing portion has a slight frictional drag to limit the change in diameter of said energizing portion of the spring in said second direction.

5. An overrunning spring clutch embodying therein, inner and outer clutch members coacting to provide a clutch spring recess with an annular clutching surface, a clutch spring in said recess and including a load carrying portion normally having a clearance with respect to said surface and a more resilient energizing portion having a slight frictional drag with said surface, the load carrying portion of the spring being connected at one end to one of said members, said load carrying portion of the spring operating in a relative rotation between said members in one direction to change its diameter in one direction to clutch against said surface to connect said members together and operating in a relative rotation between said members in the opposite diameter to change its diameter in a second direction to release from said surface and declutch said clutch members and means rotative with that member to which the first mentioned end of the spring is connected at one end, for limiting the change in diameter of said energizing portion of the spring in said second direction.

6. An overrunning spring clutch embodying therein, inner and outer clutch members coacting to provide a clutch spring recess, a clutch spring in said recess and connected at one end to said inner member and substantially free at its other end with respect to said outer member, said spring operating in a relative rotation between said members in one direction to change its diameter in one direction to clutch said members together and operating in a relative rotation between said members in the opposite direction to change its diameter in a second direction to declutch said clutch members and means mounted on and rotative with said inner member for limiting the change in diameter of a portion of said spring in said second direction.

7. An overrunning spring clutch embodying therein, inner and outer clutch members coacting to provide a clutch spring recess, a clutch spring in said recess and connected at one end to said inner member and having an energizing portion at its other end substantially free from said outer member, said spring operating in a relative movement between said members in one direction to expand its diameter to clutch said members together and operating in a relative rotation between said members in the opposite direction to contract its diameter to declutch said members and means mounted on and rotative with said inner member within said energizing portion for limiting the contraction thereof and for supporting the same when so limited.

8. An overrunning spring clutch embodying therein, inner and outer clutch members coacting to provide a clutch spring recess, a clutch spring in said recess and operating to expand to clutch said members together and operating to contract to declutch said members and an annular member mounted on and rotative with said inner clutch member and operable to provide a seat upon which a portion of said spring engages in its contraction to be limited in said contraction thereby.

9. An overrunning spring clutch embodying therein inner and outer clutch members coacting to provide a clutch spring recess, a clutch spring in said recess operating to expand to clutch said members together and operating to contract to declutch shid members, said spring including an energizing portion and a second portion and an annular member mounted on and rotative with said inner clutch member within said energizing portion and including a web portion engaged on the inner clutch member and an annular flange portion upon which said energizing portion of the spring engages in its contraction to be limited in said contraction thereby.

10. An overrunning spring clutch embodying therein inner and outer clutch members coacting to provide a clutch spring recess, a clutch spring in said recess operating to expand to clutch said members together and operating to contract to declutch said members, said spring including an energizing portion and a second portion and an annular member mounted on and rotative with said inner clutch member within said energizing portion and including an annular flange portion upon which said energizing portion of the spring engages in its contraction to be limited in said contraction thereby, said annular flange being formed at one end as a helix that corresponds in pitch to that turn of the other portion of the spring and with which it engages.

DALMAR T. BROWNLEE.